United States Patent
Nakamura et al.

(10) Patent No.: US 6,798,106 B2
(45) Date of Patent: Sep. 28, 2004

(54) VEHICLE AC GENERATOR HAVING VIBRATION-RESISTANT STATOR

(75) Inventors: Shigenobu Nakamura, Anjo (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 122 days.

(21) Appl. No.: 10/329,579

(22) Filed: Dec. 27, 2002

(65) Prior Publication Data

US 2003/0132680 A1 Jul. 17, 2003

(30) Foreign Application Priority Data

Jan. 11, 2002 (JP) ........................................ 2002-005029

(51) Int. Cl.$^7$ ............................................. H02K 19/22
(52) U.S. Cl. ........................ 310/179; 310/180; 310/184
(58) Field of Search ................................ 310/179, 180, 310/184

(56) References Cited

U.S. PATENT DOCUMENTS

| | | | |
|---|---|---|---|
| 5,982,068 A | * 11/1999 | Umeda et al. | ............... 310/206 |
| 5,998,903 A | 12/1999 | Umeda et al. | |
| 6,249,956 B1 | 6/2001 | Maeda et al. | |
| 6,417,592 B2 | * 7/2002 | Nakamura et al. | ........... 310/184 |
| 6,462,453 B1 | * 10/2002 | Asao et al. | ................... 310/179 |
| 6,501,204 B1 | * 12/2002 | Oohashi et al. | ............... 310/179 |
| 6,570,290 B2 | * 5/2003 | Kazmierczak | ............... 310/184 |
| 2002/0053126 A1 | 5/2002 | Maeda et al. | |
| 2002/0079771 A1 | 6/2002 | Taji et al. | |

FOREIGN PATENT DOCUMENTS

| | | | | |
|---|---|---|---|---|
| EP | 1179881 A1 | * 2/2002 | ............ | H02K/3/12 |
| GB | 743762 | 11/1956 | | |
| JP | 02060438 | 2/1990 | | |
| JP | 05227688 | 9/1993 | | |
| JP | 06105495 | 4/1994 | | |
| JP | 11164504 A | * 6/1999 | ............ | H02K/3/24 |
| JP | 11164505 A | * 6/1999 | ............ | H02K/3/24 |
| JP | 11285216 A | * 10/1999 | ............ | H02K/19/24 |
| JP | 11285217 A | * 10/1999 | ............ | H02K/19/24 |
| WO | WO 9854822 A1 | * 12/1998 | ............ | H02K/1/00 |
| WO | WO 9854823 A1 | * 12/1998 | ............ | H02K/1/00 |

* cited by examiner

Primary Examiner—Joseph Waks
(74) Attorney, Agent, or Firm—Oliff & Berridge, PLC

(57) ABSTRACT

A stator winding includes at least two pairs of in-slot portions aligned in a depth direction of each of slots and first and second coil-ends that respectively extend from opposite axial ends of the slots. The first coil-end a includes a plurality of crossover wires, each of which connects one of the in-slot portions disposed in one layer of the one of the slots and another of the in-slot portions disposed in another layer of second one of the slots that is spaced apart from the first one of the slots by a narrower pitch than a pole-pitch between the N and S poles. The second coil-end includes a plurality of crossover wires, each of which connects one of the in-slot portions disposed in one layer of third one of the slots and another of the in-slot portions disposed in another layer of fourth one of the slots that is spaced apart from the third one of the slots by the pole-pitch between the N and S poles. Therefore, the height of the first coil-end can be reduced, so that the rigidity of the coil-end can be increased, thereby increasing vibration resistance.

6 Claims, 8 Drawing Sheets

5 SLOT-PITCHES

VEHICLE AC GENERATOR HAVING VIBRATION-RESISTANT STATOR

CROSS REFERENCE TO RELATED APPLICATION

The present application is based on and claims priority from Japanese Patent Application 2002-5029, filed Jan. 11, 2002, the contents of which are incorporated herein by reference.

BACKGROUND OF THE INVENTION

1. Field of the Invention

The present invention relates to a vehicle ac generator to be mounted in a passenger car or a truck.

2. Description of the Related Art

Recently, weight of the vehicle engine has been reduced as a measure to solve environmental problems, while the derivability of vehicle is improved by increasing engine torque. As a result, the engine vibration is apt to increase although the displacement of the engine is the same. On the other hand, because the vehicle ac generator is mounted on the engine by a bracket to be driven by the engine, the engine vibration is transmitted to the ac generator. Therefore, it is necessary to improve vibration resistant structure of the ac generator. The vehicle ac generator is also required to be more powerful and compact in order to reduce the idling speed of the engine and the space of the engine compartment for securing a sufficient space of the passenger compartment. The reduction in the noise of the vehicle ac generator is also necessary in order to fulfil a social demand to reduce noises that the vehicle makes and a market demand to reduce noises in the passenger compartment. Of course, the above-mentioned improvement should be made at a low cost.

WO98/54823 discloses a compact, powerful and low-noise vehicle ac generator that is comprised of a stator winding that is formed by a plurality of conductor segments. One of the conductor segments that extends from one of plural layers of one of slots is connected to another conductor segment that extends from another layer of another slot. Therefore, a pair of low-resistant three-phase stator windings can be mounted in a stator at a high space factor.

However, there is no suggestion on the vibration resistance of the coil-end of the stator winding, which has a low rigidity despite of a main portion of the vehicle ac generator.

SUMMARY OF THE INVENTION

The present invention has been made in view of the above-described problems.

An object of the invention is to provide a vehicle ac generator whose vibration resistant structure is improved by increasing the rigidity of coil-ends of the stator winding.

Another object of the invention is to improve vibration resistant output wires that connect the stator and a rectifier unit.

Another object of the invention is to provide a powerful and inexpensive stator winding by reducing resistance of the stator winding.

Another object of the invention is to provide a low noise stator winding by employing a plurality of windings that are shifted in phase from one another.

In order to attain the above objects according to a feature of the invention, a vehicle ac generator including a field rotor having a plurality of claw-shaped magnetic pole pieces, a stator having a stator core and a multi-phase stator winding and a frame for supporting said rotor and said stator. In such a vehicle ac generator, there are the following features: the stator winding includes at least two pairs of in-slot portions aligned in a depth direction of each of the slots and first and second coil-ends that respectively extend from opposite axial ends of the slots to be disposed thereon; the first coil-end includes a plurality of crossover wires, each of which connects one of the in-slot portions disposed in one layer of first one of the slots and another of the in-slot portions disposed in another layer of second one of the slots that is spaced apart from the first one of the slots by a narrower pitch than a pole-pitch between the N and S poles; and the second coil-end includes a plurality of crossover wires, each of which connects one of the in-slot portions disposed in one layer of third one of the slots and another of the in-slot portions disposed in another layer of fourth one of the slots that is spaced apart from the third one of the slots by the pole-pitch between the N and S poles. Therefore, the height of the first coil-end can be reduced, so that the rigidity of the first coil-end can be increased, thereby increasing the vibration resistance. In addition, the resistance of the first coil-end can be reduced, thereby reducing the heat loss thereof to increase the output power.

According to another feature of the invention, the above-described vehicle ac generator is added the following features: the stator winding comprises a plurality of conductor segments; each of the conductor segments has an inclined portion that crosses an inclined portion of another conductor segment in one of the coil ends and an end portion of the inclined portion; the turn portion is disposed at the first coil end; and a connection portion for connecting the portion of the inclined portion to an end portion of another inclined portion is disposed at the second coil-end. Therefore, the first coil-end becomes hard while the turn portion is formed, so that the rigidity thereof increases further to increase the vibration resistance.

According to another feature of the invention, the above-described vehicle ac generator is added the following feature: one of the in-slot portions disposed in one of the slots is connected in series with another of the in-slot portions that is disposed adjacent the one of the slots, thereby forming a portion of a phase winding of the stator winding. Therefore, it is easy to connect the conductors disposed in the slots that are spaced apart from each other by a shorter pitch than a pole pitch at the first coil-end. This structure can reduce the manufacturing cost thereof.

According to another feature of the invention, the above-described vehicle ac generator is added the following feature: each output line of the stator winding extends from the first coil-end. Therefore, the distance between the first coil-end, whose height can be reduced, and the rectifier unit can be made long enough, so that a radius of a bend corner of an output wire can be large enough to improve the vibration resistance.

According to another feature of the invention, the above-described vehicle ac generator is added the following feature: those of the series-connected conductor segments that are disposed in adjacent two of the slots respectively extend in opposite circumferential directions. Therefore, it is easy to connect the conductors disposed in the slots that are spaced apart from each other by a shorter pitch than the pole pitch, at the first coil-end. As a result, the rigidity of the coil-end can be increased to increase the vibration resistance at a low cost.

According to another feature of the invention, the above-described vehicle ac generator is added the following features: the plural slots are formed of a first slot group that includes slots spaced apart from each other by one pole-pitch and a second slot group that includes slots respectively disposed adjacent the slots of the first slot group and spaced apart from the first slot group by 30 degrees in electric angle; a first multi-phase winding is disposed in the first slot group; a second multi-phase winding is disposed in the second slot group; and output power is separately provided by the first and second multi-phase windings. Therefore, the rigidity of the coil end can be increased to increase the vibration resistance, and the magnetic noise can be reduced by connecting a pair of the multi-phase windings that are 30 degrees in electric angle shifted from each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
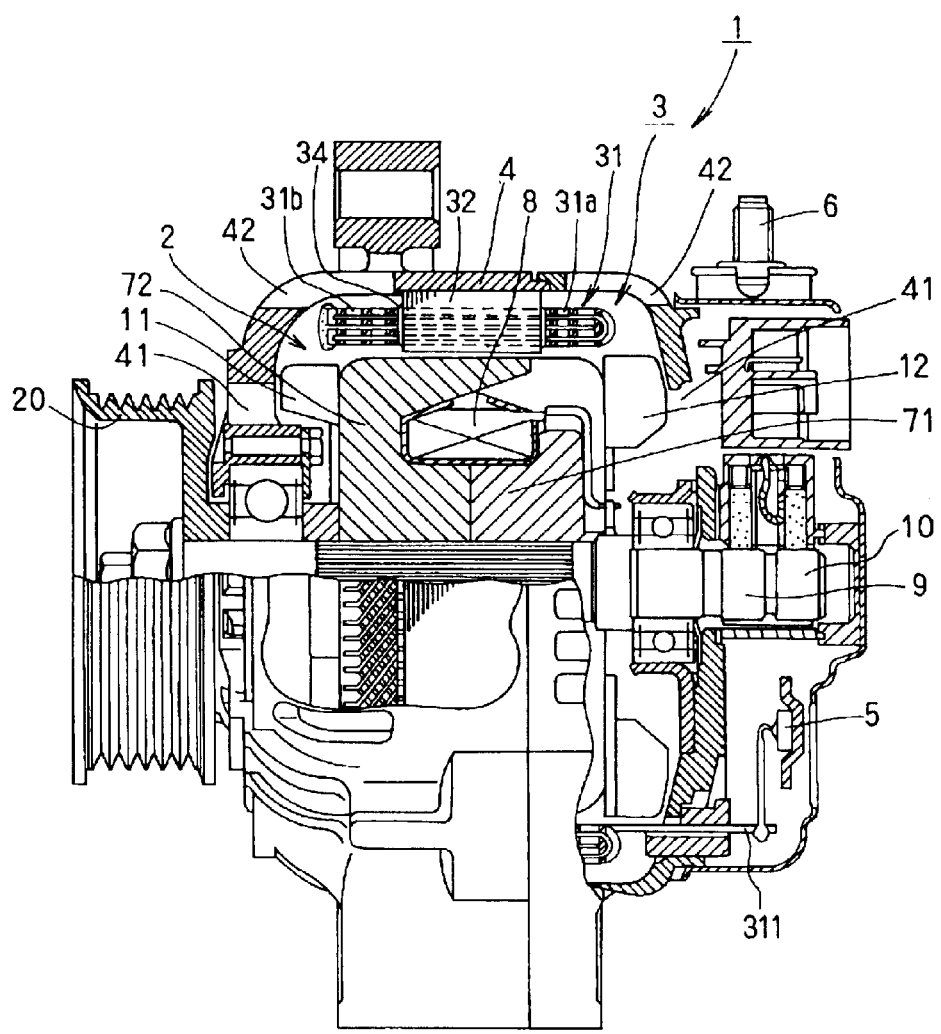
FIG. 1 is an entire view illustrating a vehicle ac generator according to the first embodiment of the invention.

Various embodiments of the invention will be described below with reference to the appended drawings.

A vehicle ac generator according to the first embodiment of the invention will be described below with reference to FIGS. 1–6.

The vehicle ac generator 1 operates when torque is transmitted from an engine to a pulley 20 and a rotor 2 that carries the pulley 20 rotates while field current is supplied via a pair of slip rings 9 and 10 to a field coil 8 that is mounted in the rotor 2. When the field current is supplied to the field coil 8, N and S magnetic poles are formed at pole cores 71, 72, so that ac voltage is generated in the stator core 31. A rectifier unit 5 is connected to an output wire 311 of the stator winding 31 to provide dc power at an output terminal 6 of the rectifier unit 5. Cooling fans 11, 12 are fixed to the pole cores 71, 72 so that cooling air is taken in from openings 41 formed at axial end portions of the frame 4 and discharged out from openings 42 formed at radially outside portions of the frame 4.

Figure 2:
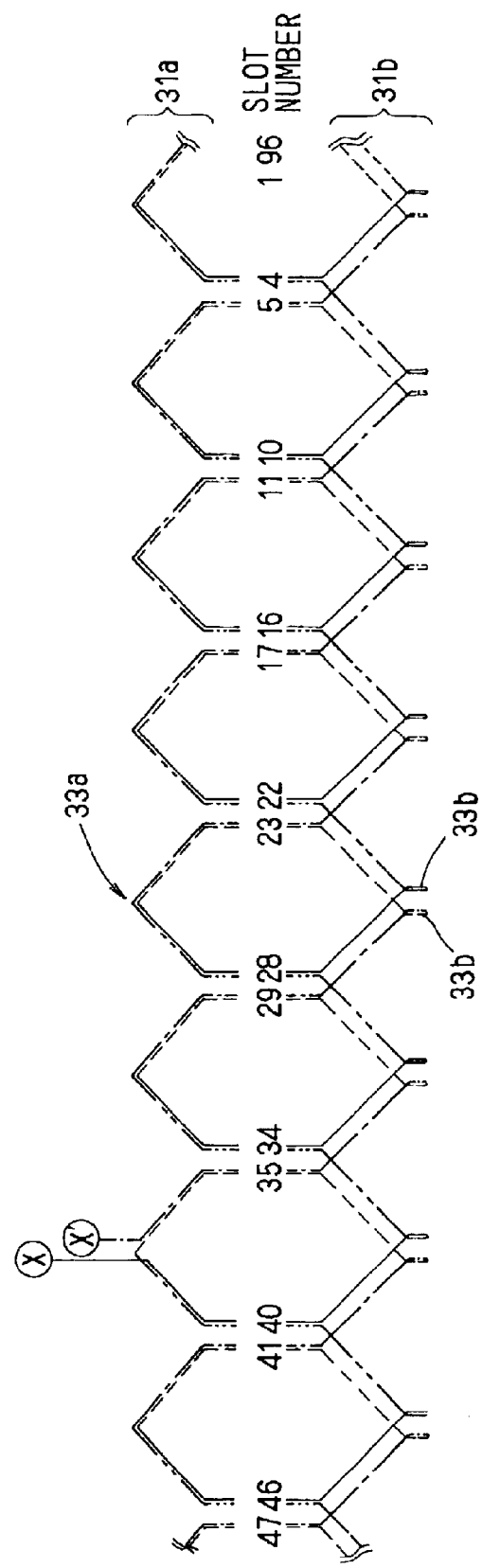
FIG. 2 is a wiring diagram of a portion of a phase winding of a stator winding according to the first embodiment.
Figure 3:
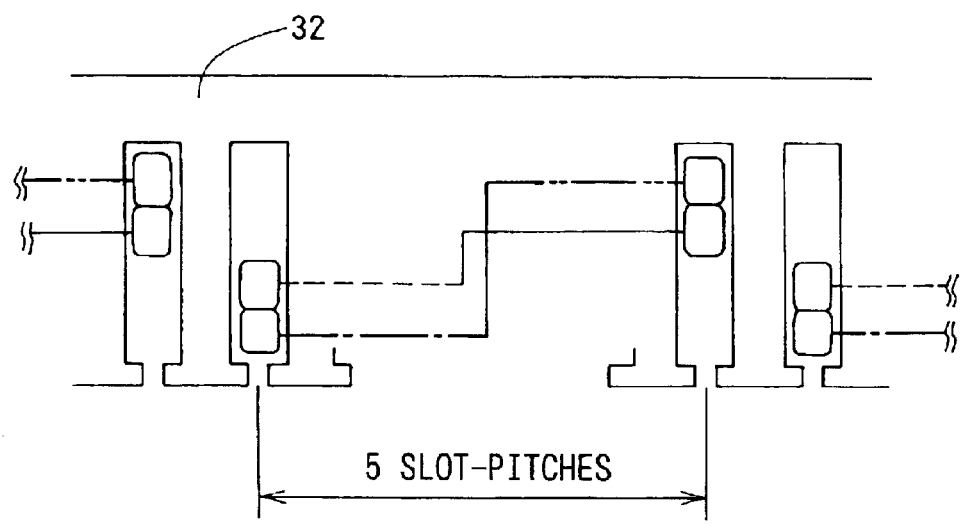
FIG. 3 is a schematic diagram of a portion of the windings shown in FIG. 2.
Figure 4:
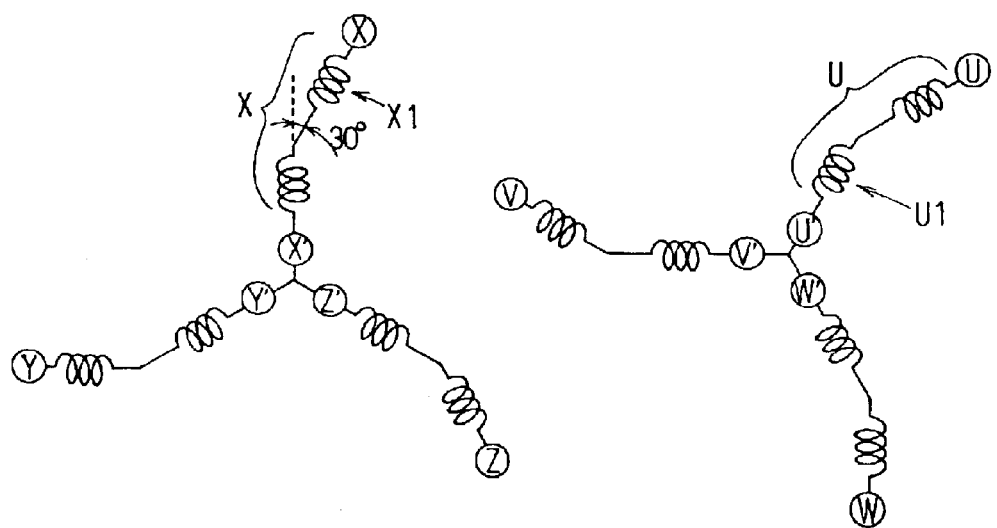
FIG. 4 is a schematic diagram illustrating a phase relationship between two winding groups of the stator winding.
Figure 5:
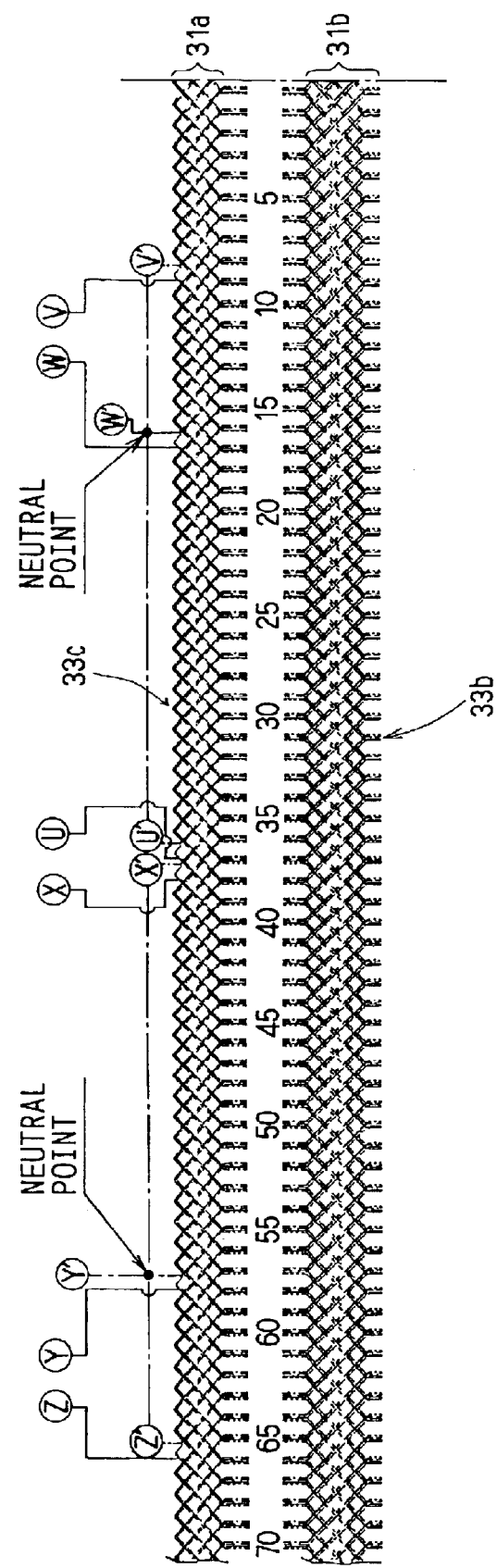
FIG. 5 is a wiring diagram including the entire stator windings according to the first embodiment.

The stator winding 31 is mounted in the slots of the stator core 32 via insulators 34. The stator winding 31 is formed of a plurality of pairs of U-shaped conductor segments. As shown in FIG. 2, turn portions 33a are disposed at the first coil-end 31a, and connection portions 33b are disposed at the second coil-end 31b. The number of NS poles is 8 and a pair of three-phase windings is disposed in the slots, as shown in FIG. 3. The number of slots is 96, and one pole-pitch of the poles that are disposed in the circumferential direction of the rotor 2 corresponds to 6 slot pitches.

As indicated by a one-dot-chain line, a broken line, a solid line and a double-dots-chain line in FIGS. 2 and 3, the conductor segments are respectively located from the inner side of the slot to the outer side thereof in the radial direction. At the first coil-end 31a, each U-shaped conductor segment is inserted into two slots that are 5 slot-pitches, which are shorter than one pole-pitch, spaced apart from each other and in layers of the slots different from each other. On the other hand, the conductor segments inserted in two slots that are 6 slot-pitches, or one pole pitch, spaced apart from each other are welded at the second coil-end 31b. A plurality of pairs of conductor segments extending from two slots that are adjacent to each other is connected in series to form a X-phase winding of the first three-phase winding. In the same manner, a Y-phase winding and a Z-phase winding, which are 120 degree in electric angle shifted from one another are formed, thereby forming the first three-phase winding. In the same manner, the second three-phase winding (which is comprised of U-phase, V-phase and W-phase windings) is formed at positions shifted by 30 degree in electric angle from the first three-phase winding. In each slot, conductor segments of the first and second three-phase windings are inserted. For example, a coil X1 of the phase winding X and a coil U1 of the phase winding U are inserted into the same slot, as shown in FIG. 3.

Figure 9:
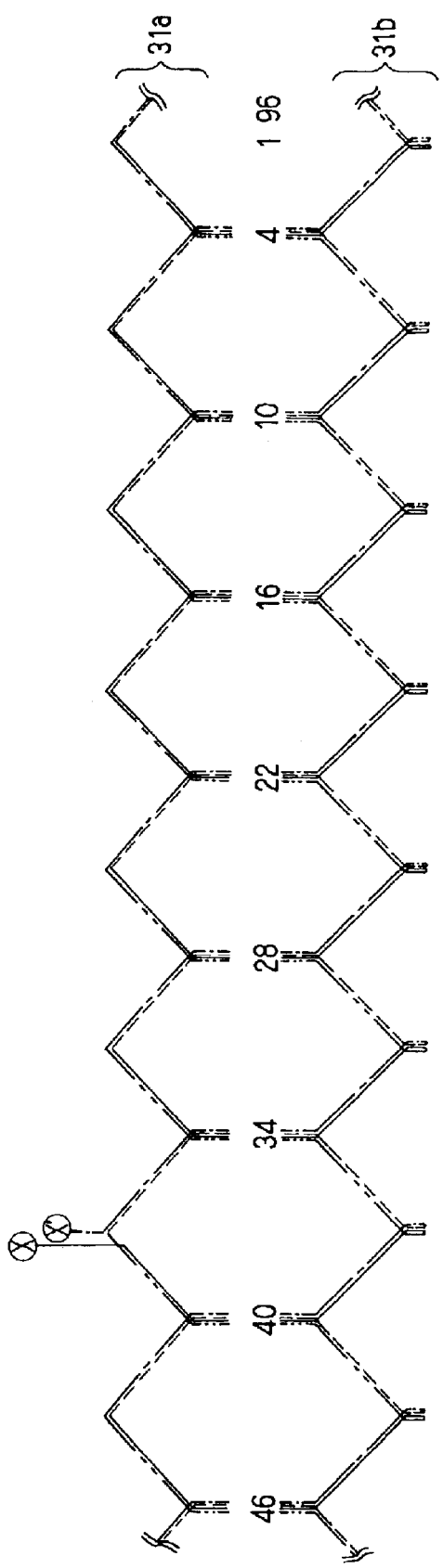
FIG. 9 is a winding diagram illustrating a portion of a phase winding of a prior art stator winding.
Figure 10:
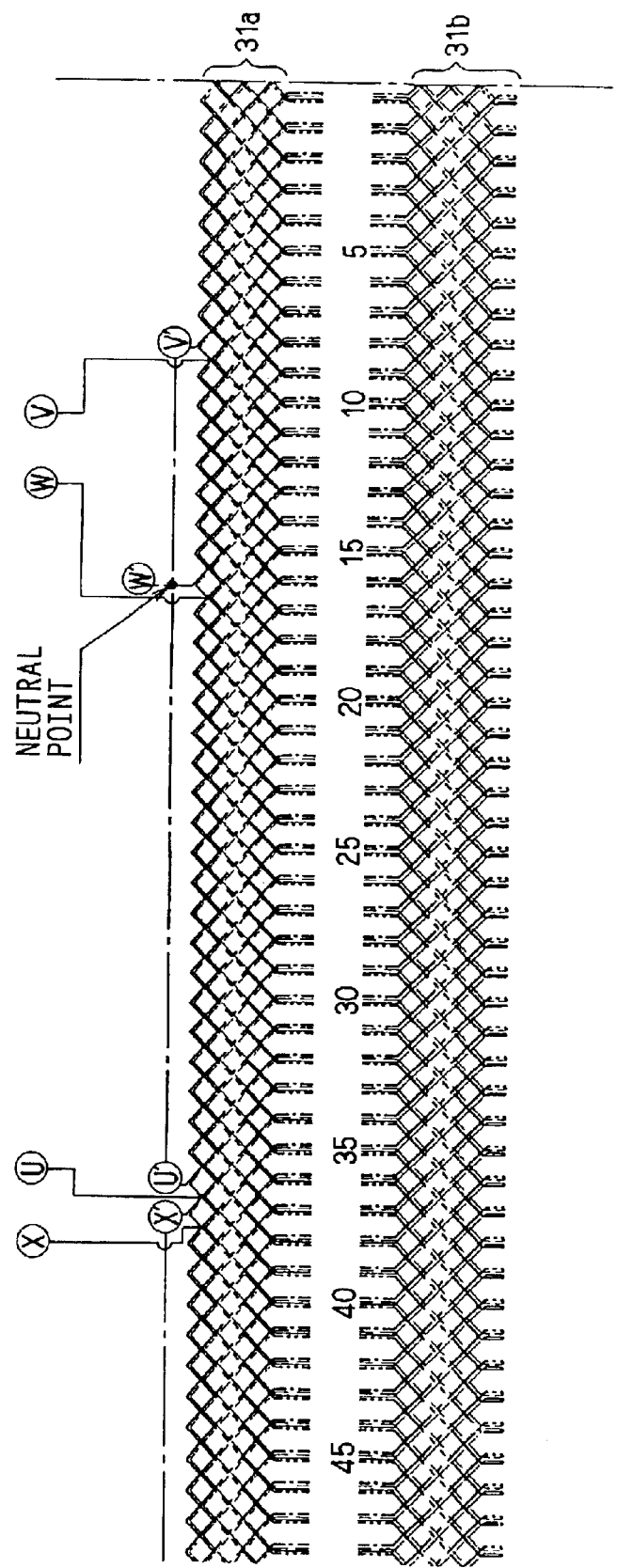
FIG. 10 is a winding diagram illustrating the entire prior art stator winding.

Because each of the conductor segments according to the invention is disposed in two slots that are 5 slot-pitches spaced apart from each other at the first coil end 31a, the length of the inclined portion of the first coil-end 31a can be reduced at the ratio of the slot pitches, if compared to a conventional winding that are disposed in two slots that are one pole pitch or 6 slot-pitches spaced apart from each other, as shown in FIG. 9 and FIG. 10.

Therefore, the height of the coil-end can be proportionally reduced. As a result, the vibration resistance of the coil-end 31a can be improved. In addition, the length of the stator winding can be reduced, so that operation heat loss can be reduced and the efficiency and the output power can be increased.

Figure 6:
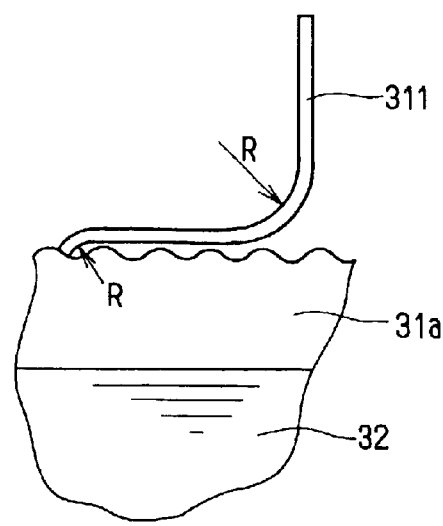
FIG. 6 is a side view of an output wire of the stator winding according to the first embodiment.

Further, the height of the coil-end 31a can be reduced, so that the radius of a bend corner of the output wire 311 can be made larger than that of a conventional stator without changing the position of the rectifier, as shown in FIG. 6. Therefore, the vibration resistance of the output wire 311 can be increased, thereby preventing the output wire 311 from breaking.

As shown in FIG. 3, coils that are shifted in phase from each other are connected in series to form a phase-coil, which is connected to others in a staggering star connection. This connection can disperse a magnetic field distortion caused by the armature reaction, so that the magnetic noise can be reduced. Because two phase windings that are shifted by 30 degree in phase angle from each other to form a staggering three-phase winding, magnetic vibration can be canceled, so that the magnetic noise can be further reduced.

Figure 7:
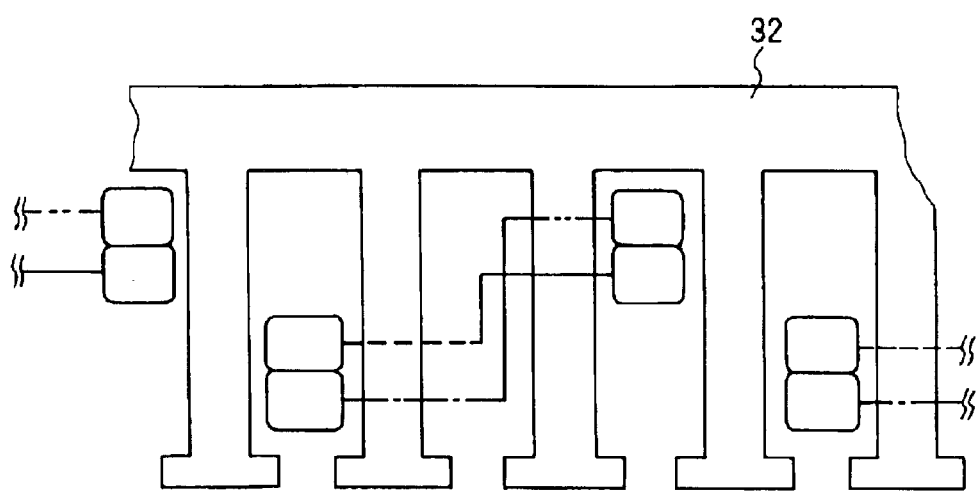
FIG. 7 is a schematic diagram illustrating a portion of a stator winding according to the second embodiment.

In the first embodiment, the number of the slots is twice as many as that of the conventional stator. However, as shown in FIG. 7, the number of the slots of the stator according to the second embodiment may be the same as the conventional stator. In this case, one coil-end is formed to connect the conductor segments between 2 slot-pitches, which is narrower than 3 slot-pitches that correspond to one pole-pitch, so that the height of the coil-end can be made as low as the first embodiment, thereby increasing the vibration resistance of the output wire.

Figure 8:
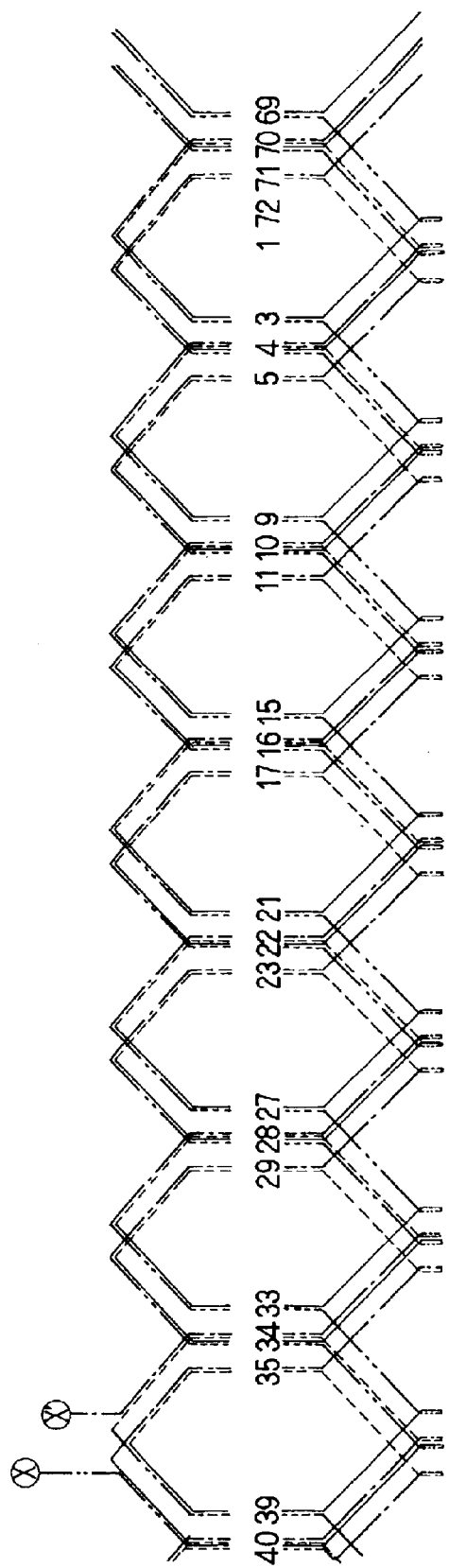
FIG. 8 is a winding diagram illustrating a portion of a stator winding according to the third embodiment.

In the first embodiment, the conductor segments disposed in two adjacent slots are connected in series. However, the stator according to the third embodiment of the invention is different. As shown in FIG. 8, the conductor segments in three adjacent slots can be connected in series to form a phase-coil, which is connected, at the coil-end 31a on the side of the turn portions, to another in the slot that is spaced apart by a shorter slot-pitch than one pole pitch. In FIG. 8, the number of each of the N poles and S poles is 6, the number of slot-pitches is 72. That is, 6 slots each pole-pitch. The number of the conductors in one phase is about 8. In this case, the same effect can be achieved.

In the above embodiments, a stator winding is formed from a plurality of conductor segments that has turn portions. Such a stator winding can be formed from continuous wires. In this case, one coil-end is formed by connecting conductors in slots that are an NS pole-pitch spaced apart from each other, and the other coil-end is formed by connecting conductors in slots that are spaced apart from each other by a shorter pitch than the NS pole-pitch.

The number of the NS poles and the adjacent slots for series connection can be changed according to the required output characteristics. The star connection of the windings can be changed to a delta connection or combined windings of the star and delta connections.

In the foregoing description of the present invention, the invention has been disclosed with reference to specific embodiments thereof It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle ac generator including a field rotor having a plurality of claw-shaped magnetic pole pieces for alternately forming N and S poles in a circumferential direction, a stator having a stator core disposed opposite said rotor and a multi-phase stator winding mounted in plural slots formed in said stator core and a frame for supporting said rotor and said stator, wherein:

said stator winding comprises at least two pairs of in-slot portions aligned in a depth direction of each of said slots and first and second coil-ends that respectively extend from opposite axial ends of said slots to be disposed thereon, said first coil-end comprises a plurality of crossover wires, each of which connects one of said in-slot portions disposed in one layer of first one of said slots and another of said in-slot portions disposed in another layer of second one of said slots that is spaced apart from said first one of said slots by a narrower pitch than a pole-pitch between said N and S poles; and said second coil-end comprises a plurality of crossover wires, each of which connects one of said in-slot portions disposed in one layer of third one of said slots and another of said in-slot portions disposed in another layer of fourth one of said slots that is spaced apart from said third one of said slots by the pole-pitch between said N and S poles.

2. The vehicle ac generator according to claim 1, wherein:

said stator winding comprises a plurality of conductor segments having a turn portion;

each of said conductor segments has an inclined portion that cross an inclined portion of another conductor segment in one of said coil ends and an end portion of said inclined portion;

said turn portion is disposed at said first coil end; and a connection portion for connecting said end portion of said inclined portion to an end portion of another inclined portion is disposed at said second coil-end.

3. The vehicle ac generator according to claim 2, wherein one of said in-slot portions disposed in one of said slots is connected in series with another of said in-slot portions that is disposed adjacent said one of said slots, thereby forming a portion of a phase winding of said stator winding.

4. The vehicle ac generator according to claim 2, wherein each output line of said stator winding extends from said first coil-end.

5. The vehicle ac generator according to claim 3, wherein those of said series-connected conductor segments that are disposed in adjacent two of said slots extend respectively in opposite circumferential directions.

6. The vehicle ac generator according to claim 1, wherein:

said plural slots are formed of a first slot group that includes slots spaced apart from each other by one pole-pitch and a second slot group that includes slots respectively disposed adjacent said slots of said first group and spaced apart from said first slot group by 30 degree in electric angle;

a first multi-phase winding is disposed in said first slot-group;

a second multi-phase winding is disposed in said second slot group, and output power is separately provided by said first and second multi-phase windings.

* * * * *